United States Patent
Lucas et al.

(10) Patent No.: US 9,582,058 B2
(45) Date of Patent: Feb. 28, 2017

(54) POWER INRUSH MANAGEMENT OF STORAGE DEVICES

(71) Applicant: SanDisk Enterprise IP LLC, Milpitas, CA (US)

(72) Inventors: Gregg S. Lucas, Tucson, AZ (US); Kenneth B. Delpapa, Natick, MA (US); Robert W. Ellis, Phoenix, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 45 days.

(21) Appl. No.: 14/135,453

(22) Filed: Dec. 19, 2013

(65) Prior Publication Data

US 2015/0153800 A1 Jun. 4, 2015

Related U.S. Application Data

(60) Provisional application No. 61/910,159, filed on Nov. 29, 2013.

(51) Int. Cl.
*G06F 1/26* (2006.01)
*G06F 1/30* (2006.01)

(52) U.S. Cl.
CPC .............. *G06F 1/305* (2013.01); *G06F 1/263* (2013.01)

(58) Field of Classification Search
CPC ............................... G06F 1/266; G06F 1/3275
USPC .................................................. 713/300, 330
See application file for complete search history.

(56) References Cited

U.S. PATENT DOCUMENTS

| 4,173,737 A | 11/1979 | Skerlos et al. |
| 4,888,750 A | 12/1989 | Kryder et al. |
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |

(Continued)

FOREIGN PATENT DOCUMENTS

| EP | 1 299 800 | 4/2003 |
| EP | 1465203 A1 | 10/2004 |

(Continued)

OTHER PUBLICATIONS

Invitation to Pay Additional Fees dated Feb. 13, 2015, received in International Patent Application No. PCT/US2014/063949, which corresponds to U.S. Appl. No. 14/135,433, 6 pages (Delpapa).

(Continued)

*Primary Examiner* — Mark Connolly
(74) *Attorney, Agent, or Firm* — Morgan, Lewis & Bockius LLP

(57) ABSTRACT

The various embodiments described herein include systems, methods and/or devices used to enable power inrush management of storage devices (e.g., DIMM devices). In one aspect, the method includes, for at least one storage device populated in a slot of a plurality of storage device slots, the plurality of storage device slots configured to be populated by two or more storage devices: (1) detecting a unique location associated with the storage device, (2) determining a time delay for the storage device in accordance with the unique location associated with the storage device, and (3) delaying at least one power-on operation of the storage device by the time delay for the storage device.

19 Claims, 9 Drawing Sheets

(56) References Cited

U.S. PATENT DOCUMENTS

| | | |
|---|---|---|
| 5,381,528 A | 1/1995 | Brunelle |
| 5,404,485 A | 4/1995 | Ban |
| 5,488,702 A | 1/1996 | Byers et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A * | 6/1997 | Jeffries ................. G06F 11/006 710/9 |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,104,304 A | 8/2000 | Clark et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh |
| 6,311,263 B1 | 10/2001 | Barlow et al. |
| 6,408,394 B1 * | 6/2002 | Vander Kamp ........... G06F 1/26 710/104 |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,678,788 B1 | 1/2004 | O'Connell |
| 6,728,879 B1 | 4/2004 | Atkinson |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,934,755 B1 | 8/2005 | Saulpaugh et al. |
| 6,966,006 B2 * | 11/2005 | Pacheco ................. G11B 19/20 713/300 |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 * | 11/2006 | Sone ........................ G06F 1/184 713/300 |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,269,755 B2 | 9/2007 | Moshayedi et al. |
| 7,275,170 B2 | 9/2007 | Suzuki |
| 7,295,479 B2 | 11/2007 | Yoon et al. |
| 7,328,377 B1 | 2/2008 | Lewis et al. |
| 7,426,633 B2 | 9/2008 | Thompson et al. |
| 7,486,561 B2 | 2/2009 | Mokhlesi |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 * | 6/2009 | Kubo ........................ G06F 1/26 710/10 |
| 7,566,987 B2 * | 7/2009 | Black ..................... H05B 37/02 307/41 |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,809,836 B2 | 10/2010 | Mihm et al. |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,261,020 B2 | 9/2012 | Krishnaprasad et al. |
| 8,312,349 B2 | 11/2012 | Reche et al. |
| 8,385,117 B2 | 2/2013 | Sakurada et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,832,384 B1 | 9/2014 | de la Iglesia |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,043,517 B1 | 5/2015 | Sprouse et al. |
| 9,128,690 B2 | 9/2015 | Lotzenburger et al. |
| 9,329,789 B1 | 5/2016 | Chu et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |

(56) References Cited

U.S. PATENT DOCUMENTS

| | | |
|---|---|---|
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1* | 5/2005 | Yuan ............... G06F 1/266 713/330 |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwall et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |

(56) References Cited

U.S. PATENT DOCUMENTS

| | | |
|---|---|---|
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1* | 12/2010 | Trantham ............... G06F 1/30 713/300 |
| 2010/0332863 A1* | 12/2010 | Johnston ............... G11C 5/141 713/300 |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bal et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1* | 3/2013 | Smola ............... H02J 3/14 700/292 |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |

(56) References Cited

U.S. PATENT DOCUMENTS

| | | |
|---|---|---|
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1* | 6/2015 | Lucas .................... G06F 1/266 713/300 |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| WO | WO 2007/036834 A2 | 4/2007 |
| WO | WO 2007/080586 A2 | 7/2007 |
| WO | WO 2008/075292 | 6/2008 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Jan. 21, 2015, received in International Application No. PCT/US2014/059748, which corresponds to U.S. Appl. No. 14/137,511, 13 pages (Dancho).

International Search Report and Written Opinion dated Feb. 18, 2015, received in International Application No. PCT/US2014/066921, which corresponds to U.S. Appl. No. 14/135,260, 13 pages (Fitzpatrick).

Barr, Introduction to Watchdog Timers, Oct. 2001, 3 pgs.

Canim, Buffered Bloom ilters on Solid State Storage, ADMS*10, Singapore, Sep. 13-17, 2010, 8 pgs.

Kang, A Multi-Channel Architecture for High-Performance NAND Flash-Based Storage System, J. Syst. Archit., 53, 9, Sep. 2007, 15 pgs.

Kim, A Space-Efficient Flash Translation Layer for CompactFlash Systems, May 2002, 10 pgs.

Lu, A Forest-structured Bloom Filter with Flash Memory, MSST 2011, Denver, CO, May 23-27, 2011, article, 6 pgs.

Lu, A Forest-structured Bloom Filter with Flash Memory, MSST 2011, Denver, CO, May 23-27, 2011, presentation slides, 25 pgs.

McLean, Information Technology—AT Attachment with Packet Interface Extension, Aug. 19, 1998, 339 pgs.

Park, A High Performance Controller for NAND Flash-Based Solid State Disk (NSSD), Feb. 12-16, 2006, 4 pgs.

Pliant Technology, International Search Report / Written Opinion, PCT/US08/88133, Mar. 19, 2009, 7 pgs.

Pliant Technology, International Search Report / Written Opinion, PCT/US08/88136, Mar. 19, 2009, 7 pgs.

Pliant Technology, International Search Report / Written Opinion, PCT/US08/88146, Feb. 26, 2009, 10 pgs.

Pliant Technology, International Search Report / Written Opinion, PCT/US08/88154, Feb. 27, 2009, 8 pgs.

Pliant Technology, International Search Report / Written Opinion, PCT/US08/88164, Feb. 13, 2009, 6 pgs.

Pliant Technology, International Search Report / Written Opinion, PCT/US08/88206, Feb. 18, 2009, 8 pgs.

Pliant Technology, International Search Report / Written Opinion, PCT/US08/88217, Feb. 19, 2009, 7 pgs.

Pliant Technology, International Search Report / Written Opinion, PCT/US08/88229, Feb. 13, 2009, 7 pgs.

Pliant Technology, International Search Report / Written Opinion, PCT/US08/88232, Feb. 19, 2009, 8 pgs.

Pliant Technology, International Search Report / Written Opinion, PCT/US08/88236, Feb. 19, 2009, 7 pgs.

Pliant Technology, International Search Report / Written Opinion, PCT/US2011/028637, Oct. 27, 2011, 11 pgs.

Pliant Technology, Supplementary ESR, 08866997.3, Feb. 23, 2012, 6 pgs.

SanDisk Enterprise IP LLC, International Search Report / Written Opinion, PCT/US2012/042764, Aug. 31, 2012, 12 pgs.

SanDisk Enterprise IP LLC, International Search Report / Written Opinion, PCT/US2012/042771, Mar. 4, 2013, 14 pgs.

SanDisk Enterprise IP LLC, International Search Report / Written Opinion, PCT/US2012/042775, Sep. 26, 2012, 8 pgs.

SanDisk Enterprise IP LLC, International Search Report / Written Opinion, PCT/US2012/059447, Jun. 6, 2013, 12 pgs.

SanDisk Enterprise IP LLC, International Search Report / Written Opinion, PCT/US2012/059453, Jun. 6, 2013, 12 pgs.

Sandisk Enterprise IP LLC, International Search Report / Written Opinion, PCT/US2012/059459, Feb. 14, 2013, 9 pgs.

SanDisk Enterprise IP LLC, International Search Report / Written Opinion, PCT/US2012/065914, May 23, 2013, 7 pgs.

(56) References Cited

OTHER PUBLICATIONS

SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Lee et al., "A Semi-Preemptive Garbage Collector for Solid State Drives," Apr. 2011, IEEE, pp. 12-21.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Jul. 25, 2014, received in International Patent Application No. PCT/US2014/029453, which corresponds to U.S. Appl. No. 13/963,444, 9 pages (Frayer).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
Bayer, "Prefix B-Trees", IP.com Journal, IP.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages (Ellis).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Sep. 14, 2015, received in International Patent Application No. PCT/US2015/036807, which corresponds to U.S. Appl. No. 14/311,152, 9 pages (Higgins).
IBM Research—Zurich, "The Fundamental Limit of Flash Random Write Performance: Understanding, Analysis and Performance Modeling," Mar. 31, 2010, pp. 1-15.
Gasior, "Gigabyte's i-Ram storage device, Ram disk without the fuss," The Tech Report, p. 1, Jan. 25, 2006, 5 pages.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
Office Action dated Apr. 25, 2016, received in Chinese Patent Application No. 201280066282.4, which corresponds to U.S. Appl. No. 13/602,047, 8 pages (Tai).

\* cited by examiner

POWER INRUSH MANAGEMENT OF STORAGE DEVICES

RELATED APPLICATION

This application claims priority to U.S. Provisional Patent Application Ser. No. 61/910,159, filed Nov. 29, 2013, entitled "Power Inrush Management of Storage Devices," which is hereby incorporated by reference in its entirety.

TECHNICAL FIELD

The disclosed embodiments relate generally to memory systems, and in particular, to power inrush management of storage devices (e.g., memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Some storage devices (e.g., memory devices) demand high power during power-on. As a number of storage devices used in a host system increases, power management of the storage devices is important.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable power inrush management of storage devices (e.g., DIMM devices). In one aspect, for at least one storage device populated in a slot of a plurality of storage device slots, the plurality of storage device slots configured to be populated by two or more storage devices, at least one power-on operation of the storage device is delayed by a time delay determined in accordance with a unique location associated with the storage device.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
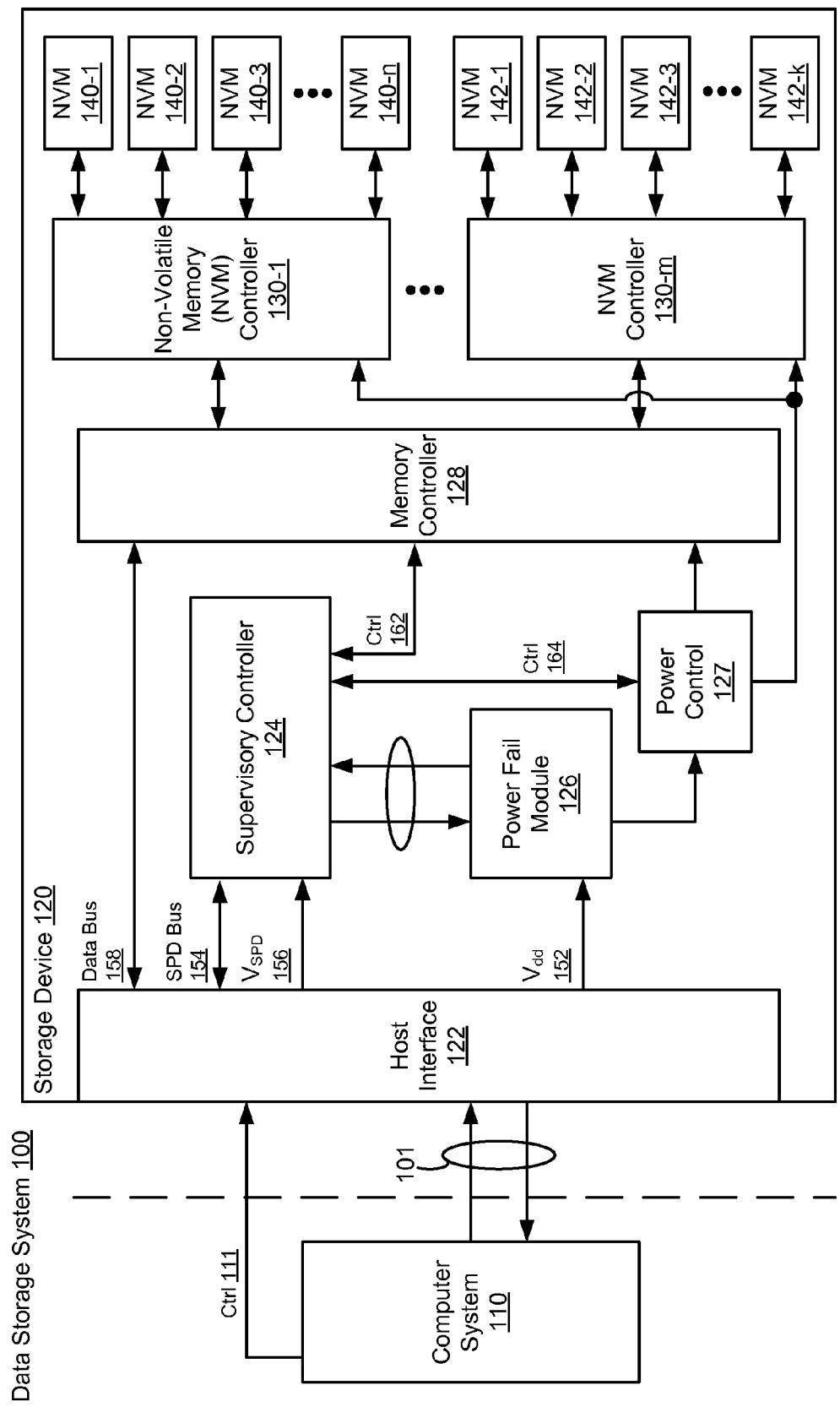
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices for power inrush management of storage devices (e.g., DIMM devices). Some implementations include systems, methods and/or devices to, for at least one storage device populated in a slot of a plurality of storage device slots, the plurality of storage device slots configured to be populated by two or more storage devices, delay at least one power-on operation of the storage device by a time delay determined in accordance with a unique location associated with the storage device.

More specifically, some embodiments include a method of power management of a plurality of storage device slots configured to be populated by two or more storage devices. In some embodiments, the method includes, for at least one storage device populated in a slot of the plurality of storage device slots: (1) detecting a unique location associated with the storage device, (2) determining a time delay for the storage device in accordance with the unique location associated with the storage device, and (3) delaying at least one power-on operation of the storage device by the time delay for the storage device.

In some embodiments, the two or more storage devices include two or more dual in-line memory module (DIMM) devices.

In some embodiments, detecting the unique location associated with the storage device includes monitoring signals used for System Management Bus (SMBus) addressing.

In some embodiments, detecting the unique location associated with the storage device includes monitoring signals used for SMBus addressing and monitoring one or more additional signals.

In some embodiments, determining the time delay for the storage device in accordance with the unique location associated with the storage device includes obtaining the time delay from non-volatile memory in the storage device.

In some embodiments, determining the time delay for the storage device in accordance with the unique location associated with the storage device includes obtaining the time delay from a host system.

In some embodiments, determining the time delay for the storage device in accordance with the unique location associated with the storage device includes using a predefined time interval to determine the time delay.

In some embodiments, the predefined time interval is programmable.

In some embodiments, each storage device of the two or more storage devices includes an energy storage device, and the predefined time interval is less than a charge time to charge the energy storage device to a predefined level.

In some embodiments, each storage device of the two or more storage devices includes an energy storage device, and delaying at least one power-on operation of the storage device by the time delay for the storage device includes delaying charging of the energy storage device by the time delay for the storage device.

In some embodiments, each storage device of the two or more storage devices includes an energy storage device, and delaying at least one power-on operation of the storage device by the time delay for the storage device includes delaying enabling of a power regulator dedicated to providing power to the energy storage device by the time delay for the storage device.

In some embodiments, the energy storage device includes one or more capacitors.

In some embodiments, the storage device includes a plurality of non-volatile memory (NVM) controllers, and the method further includes, for at least one NVM controller of the plurality of NVM controllers, delaying power-on of the NVM controller.

In some embodiments, the storage device includes an independent power domain for each NVM controller of the plurality of NVM controllers, and the independent power domains for the NVM controllers are powered-on at staggered times.

In some embodiments, each NVM controller of the plurality of NVM controllers has an independent reset signal, and the reset signals so the plurality of NVM controllers are released at staggered times.

In another aspect, any of the methods described above are performed by a storage device including: (1) an interface for operatively coupling the storage device with a host system, (2) an energy storage device, (3) a controller with one or more processors and memory, the controller configured to perform and/or control performance of any of the methods described herein. In some embodiments, the storage device includes a plurality of controllers. In some embodiments, the storage device includes a supervisory controller.

In yet another aspect, any of the methods described above are performed by a storage device including an interface for operatively coupling the storage device with a host system and means for performing any of the methods described herein.

In yet another aspect, some embodiments include a non-transitory computer readable storage medium, storing one or more programs for execution by one or more processors of a storage device, the one or more programs including instructions for performing any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120, which includes host interface 122, supervisory controller 124 (sometimes called power control processor), power fail module 126, power control 127, memory controller 128, one or more non-volatile memory (NVM) controllers 130 (e.g., NVM controller 130-1 through NVM controller 130-*m*), and non-volatile memory (NVM) (e.g., one or more NVM device(s) 140, 142 such as one or more flash memory devices), and is used in conjunction with computer system 110.

Computer system 110 is coupled with storage device 120 through data connections 101. However, in some embodiments, computer system 110 includes storage device 120 as a component and/or sub-system. Computer system 110 may be any suitable computing device, such as a personal computer, a workstation, a computer server, or any other computing device. Computer system 110 is sometimes called a host or host system. In some embodiments, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some embodiments, computer system 110 sends one or more host commands (e.g., read commands and/or write commands) on control line 111 to storage device 120. In some embodiments, computer system 110 is a server system, such as a server system in a data center, and does not have a display and other user interface components.

In some embodiments, storage device 120 includes a single NVM device (e.g., a single flash memory device) while in other embodiments storage device 120 includes a plurality of NVM devices (e.g., a plurality of flash memory devices). In some embodiments, NVM devices 140, 142 include NAND-type flash memory or NOR-type flash memory. Further, in some embodiments, NVM controller 130 is a solid-state drive (SSD) controller. However, one or more other types of storage media may be included in accordance with aspects of a wide variety of implementations. In some embodiments, storage device 120 is or includes a dual in-line memory module (DIMM) device. In some embodiments, storage device 120 is compatible with a DIMM memory slot. For example, in some embodiments, storage device 120 is compatible with a 240-pin DIMM memory slot and is compatible with signaling in accordance with a double data rate type three synchronous dynamic random access memory (DDR3) interface specification.

In some embodiments, storage device 120 includes NVM devices 140, 142 (e.g., NVM devices 140-1 through 140-*n* and NVM devices 142-1 through 142-*k*) and NVM controllers 130 (e.g., NVM controllers 130-1 through 130-*m*). In some embodiments, each NVM controller of NVM controllers 130 include one or more processing units (sometimes called CPUs or processors or microprocessors or microcontrollers) configured to execute instructions in one or more programs (e.g., in NVM controllers 130). NVM devices 140, 142 are coupled with NVM controllers 130 through connections that typically convey commands in addition to data, and, optionally, convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile memory controller(s).

In some embodiments, storage device 120 also includes host interface 122, supervisory controller 124, power fail module 126, power control 127, and memory controller 128, or a superset or subset thereof. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some embodiments, supervisory controller 124 (sometimes called power control processor) includes one or more processing units (also sometimes called CPUs or processors or microprocessors or microcontrollers) configured to execute instructions in one or more programs (e.g., in supervisory controller 124). Supervisory controller 124 is typically coupled with host interface 122, power fail module 126, power control 127, memory controller 128, and NVM controllers 130 (connection not shown) in order to coordinate the operation of these components, including supervising and controlling functions such as power up, power down, data hardening, charging energy storage device(s), data logging, and other aspects of managing functions on storage device 120. Supervisory controller 124 is coupled with host interface 122 via serial presence detect (SPD) bus 154 and receives supply voltage line $V_{SPD}$ 156 from the host interface 122. $V_{SPD}$ 156 is typically a standardized voltage (e.g., 3.3 volts). Serial presence detect (SPD) refers to a standardized way to automatically access information about a computer memory module (e.g., storage device 120). In some embodiments, supervisory controller 124 includes circuitry configured to monitor an input voltage (e.g., $V_{SPD}$ 156). In some embodiments, if the memory module has a failure, the failure can be communicated with a host system (e.g., computer system 110) via SPD bus 154.

Power fail module 126 is typically coupled with host interface 122, supervisory controller 124, and power control 127. Power fail module 126 is configured to monitor one or more input voltages (e.g., $V_{dd}$ 152 and, optionally, $V_{SPD}$ 156 if provided to power fail module 126) provided to storage device 120 by a host system (e.g., computer system 110). In response to detecting a power fail condition (e.g., an under or over voltage event) of an input voltage, power fail module 126 is configured to provide a $V_{dd}$ PFAIL signal to supervisory controller 124. In some embodiments, in response to detecting the power fail condition, power fail module 126 discharges an energy storage device to provide power to memory controller 128 and NVM controllers 130. Power fail module 126 is described in further detail below with respect to FIGS. 3-4. In response to receiving a PFAIL signal indicating a power fail condition (e.g., a $V_{dd}$ PFAIL signal from power fail module 126 or a $V_{SPD}$ PFAIL signal from voltage monitoring circuitry within supervisory controller 124), supervisory controller 124 performs one or more operations of a power fail process including, but not limited to, signaling the power fail condition to a plurality of controllers on storage device 120 (e.g., memory controller 128 and NVM controllers 130) via control lines 162 (connection to NVM controllers 130 not shown).

Power control 127 is typically coupled with supervisory controller 124, power fail module 126, memory controller 128, and NVM controllers 130 in order to provide power to these components. In some embodiments, power control 127 includes one or more voltage regulators (sometimes called power regulators) controlled by supervisory controller 124 via control line 164. Furthermore, in some embodiments, power control 127 is configured to remove power from a specified NVM controller 130 in response to a command from supervisory controller 124 via control line 164.

Memory controller 128 is typically coupled with host interface 122, supervisory controller 124, power control 127, and NVM controllers 130. In some embodiments, during a write operation, memory controller 128 receives data via data bus 158 from computer system 110 through host interface 122 and during a read operation, memory controller 128 sends data to computer system 110 through host interface 122 via data bus 158. Further, host interface 122 provides additional data, signals, voltages, and/or other information needed for communication between memory controller 128 and computer system 110. In some embodiments, memory controller 128 and host interface 122 use a defined interface standard for communication, such as double data rate type three synchronous dynamic random access memory (DDR3). In some embodiments, memory controller 128 and NVM controllers 130 use a defined interface standard for communication, such as serial advance technology attachment (SATA). In some other embodiments, the device interface used by memory controller 128 to communicate with NVM controllers 130 is SAS (serial attached SCSI), or other storage interface. In some embodiments, memory controller 128 maps DDR interface commands from the host system (e.g., computer system 1120) to SATA or SAS interface commands for the plurality of controllers (e.g., memory controller 128 and NVM controllers 130). In some embodiments, memory controller 128 includes one or more processing units (also sometimes called CPUs or processors or microprocessors or microcontrollers) configured to execute instructions in one or more programs (e.g., in memory controller 128).

Figure 2:
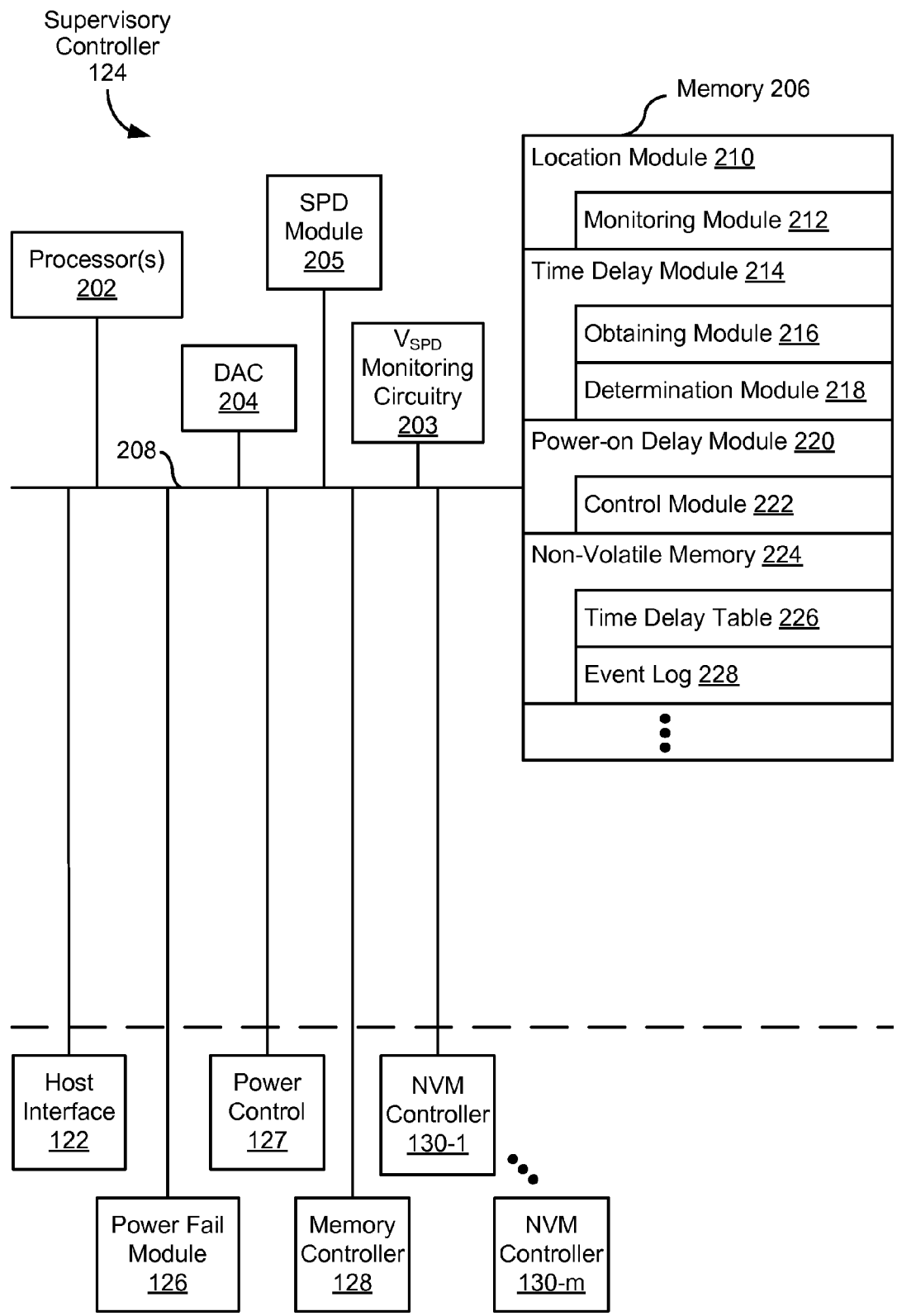
FIG. 2 is a block diagram illustrating an implementation of a supervisory controller, in accordance with some embodiments.

FIG. 2 is a block diagram illustrating an implementation of supervisory controller 124, in accordance with some embodiments. Supervisory controller 124 includes one or more processors 202 (sometimes called CPUs or processing units or microprocessors or microcontrollers) for executing modules, programs and/or instructions stored in memory 206 and thereby performing processing operations, serial presence detect (SPD) module 205 (e.g., non-volatile memory) storing information related to storage device 120 (e.g., a serial number, memory type, supported communication protocol, etc.), memory 206, optionally a digital-to-analog converter (DAC) 204 for converting digital values to an analog signal (e.g., a portion of an integrated or partially integrated DAC/ADC), optionally $V_{SPD}$ monitoring circuitry 203 configured to detect an under or over voltage event as to $V_{SPD}$ (e.g., $V_{SPD}$ 156, FIG. 1), and one or more communication buses 208 for interconnecting these components. Communication buses 208, optionally, include circuitry (sometimes called a chipset) that interconnects and controls communications between system components. In some embodiments, supervisory controller 124 is coupled with host interface 122, power fail module 126, power control 127, memory controller 128, and NVM controllers 130 (e.g., NVM controllers 130-1 through 130-m) by communication buses 208.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206, optionally, includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206, stores the following programs, modules, and data structures, or a subset or superset thereof:

location module 210 that is used for detecting a unique location associated with a storage device (e.g., storage device 120, FIG. 1), optionally including:
monitoring module 212 that is used for monitoring signals used for SMBus addressing and/or monitoring one or more additional signals;
time delay module 214 that is used for determining a time delay for the storage device in accordance with the unique location associated with the storage device, optionally including:
obtaining module 216 that is used for obtaining the time delay from non-volatile memory in the storage device and/or from a host system; and
determination module 218 that is used for determining the time delay for the storage device using a predefined time interval to determine the time delay;
power-on delay module 220 that is used for delaying at least one power-on operation of the storage device by the time delay for the storage device, optionally including:
control module 222 that is used for delaying at least one power-on operation by controlling one or more modules on the storage device (e.g., power fail module 126 and/or power control 127, FIG. 1); and
optionally, non-volatile memory 224 for storing information related to the operations of the storage device, optionally including:
time delay table 226 for storing a plurality of predefined time delays (e.g., time delays associated with various unique locations); and
event log 228 for storing information related to events on the storage device (e.g., the time and occurrence of a power fail condition).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, include instructions for implementing any of the methods described below with reference to FIGS. 7A-7C.

Although FIG. 2 shows supervisory controller 124 in accordance with some embodiments, FIG. 2 is intended more as a functional description of the various features which may be present in supervisory controller 124 than as a structural schematic of the embodiments described herein. In practice, and as recognized by those of ordinary skill in the art, items shown separately could be combined and some items could be separated.

Figure 3:
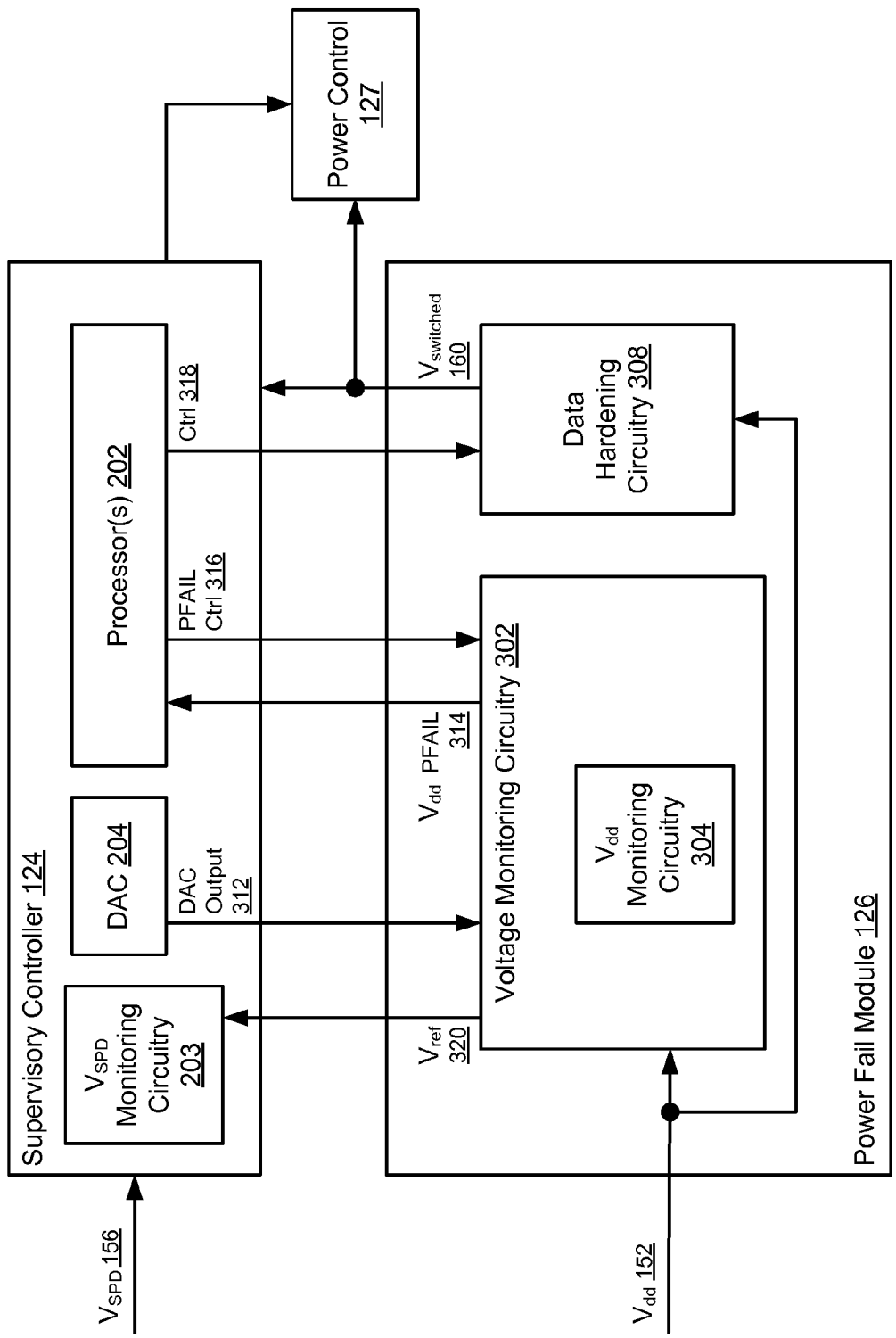
FIG. 3 is a block diagram illustrating an implementation of a portion of a storage device, in accordance with some embodiments.

FIG. 3 is a block diagram illustrating an implementation of a portion of storage device 120, in accordance with some embodiments. While some example features are illustrated, various other features have not been illustrated for the sake of brevity and so as not to obscure more pertinent aspects of the example implementations disclosed herein. To that end, as a non-limiting example, supervisory controller 124 includes one or more processors 202, DAC 204, and, optionally, $V_{SPD}$ monitoring circuitry 203, and power fail module 126 includes voltage monitoring circuitry 302 and data hardening circuitry 308. In some embodiments, DAC 204 is a component of one or more processors 202. In some embodiments, $V_{dd}$ 152 is a voltage supplied by the host system (e.g., computer system 110, FIG. 1). In some embodiments, $V_{dd}$ 152 has a target value of 1.5 volts or less (e.g., 1.25 volts, 1.35 volts, or 1.5 volts). For example, for a double data rate type three (DDR3) interface specification, $V_{dd}$ 152 is 1.25 volts, 1.35 volts or 1.5 volts. In some embodiments, $V_{SPD}$ 156 is a voltage supplied by the host system for a serial presence detect (SPD) functionality. In some embodiments, $V_{SPD}$ 156 has a target value of 3.3 volts. In some embodiments, $V_{dd}$ 152 supports a higher level of electric power consumption by supervisory controller 124 and/or operation of supervisory controller 124 at a higher performance level than when supervisory controller 124 is powered by $V_{SPD}$ 156.

In some embodiments, voltage monitoring circuitry 302 is configured to detect a power fail condition (e.g., an under or over voltage event) as to an input voltage (e.g., $V_{dd}$ 152) supplied by a host system (e.g., computer system 110, FIG. 1) and signal the power fail condition (e.g., $V_{dd}$ PFAIL 314) to supervisory controller 124. In some embodiments, voltage monitoring circuitry 302 includes $V_{dd}$ monitoring circuitry 304 configured to detect an under or over voltage event as to $V_{dd}$ 152.

In some embodiments, supervisory controller 124 includes $V_{SPD}$ monitoring circuitry 203 configured to detect an under or over voltage event as to $V_{SPD}$ 156. Although FIG. 3 shows $V_{SPD}$ monitoring circuitry 203 included in supervisory controller 124, in other embodiments, $V_{SPD}$ monitoring circuitry 203 is included in voltage monitoring circuitry 302 in power fail module 126. Further, although $V_{SPD}$ monitoring circuitry 203 and DAC 204 are shown in FIG. 3 as separate modules, in some embodiments, $V_{SPD}$ monitoring circuitry 203 and/or DAC 204 are embedded in processor(s) 202.

In some embodiments, data hardening circuitry 308 is configured to interconnect an energy storage device to provide power to memory controller 128 and NVM controllers 130. Data hardening circuitry 308 is described in more detail below with respect to FIG. 4.

Figure 4:
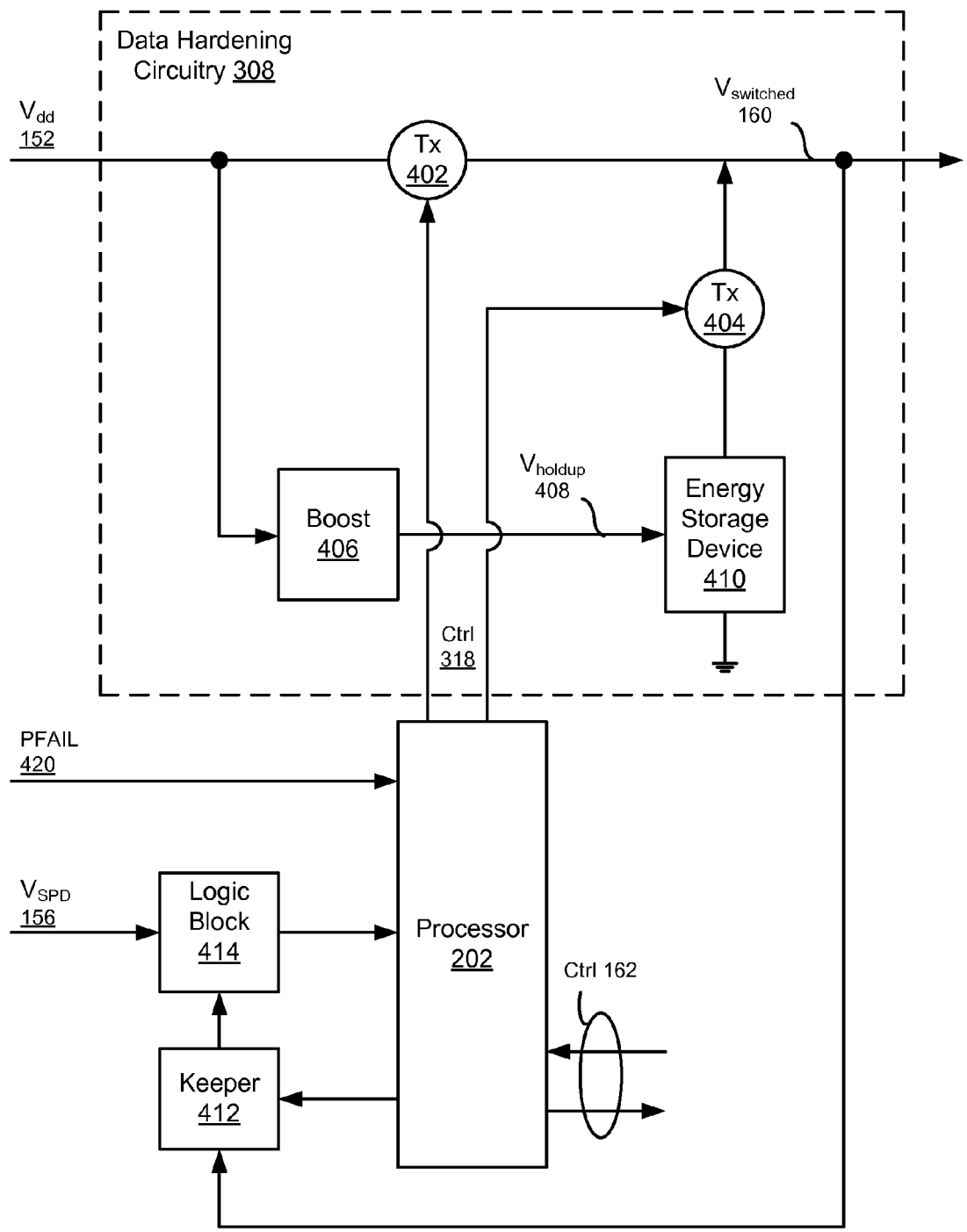
FIG. 4 is a block diagram illustrating an implementation of data hardening circuitry, in accordance with some embodiments.

FIG. 4 is a block diagram illustrating an implementation of data hardening circuitry 308, in accordance with some embodiments. While some example features are illustrated, various other features have not been illustrated for the sake of brevity and so as not to obscure more pertinent aspects of the example implementations disclosed herein. To that end, as a non-limiting example, data hardening circuitry 308 includes transistors 402 and 404, boost circuitry 406, and energy storage device 410. In some embodiments, energy storage device 410 is configured to provide power for, or solely for, power fail operations. Further, in some embodiments, the aforementioned power fail operations include "hard power fail" operations, resulting from a detected loss of power, and "soft power fail" operations, performed in accordance with a host command or internally detected condition. In some embodiments, a primary function of a respective power fail operation is to persistently store, in non-volatile memory, data resident in volatile memory at the initiation of the power fail operation.

In some embodiments, $V_{holdup}$ 408 is a boosted voltage, higher than $V_{dd}$ 152, and has a target value of 5.7 volts. In some embodiments, $V_{holdup}$ 408 is used to charge an energy storage device 410 (e.g., one or more hold-up capacitors). Further, in some embodiments, only one of transistors 402, 404 is enabled at any one time. In some embodiments, data hardening circuit 308's energy storage device 410 stores, immediately prior to a power fail condition being detected, at least approximately 30 to 70 mJ of energy per NVM controller 130 in storage device 120.

In some embodiments, supervisory controller 124 or a component thereof (e.g., processor 202) monitors and manages the functionality of data hardening circuitry 308. For example, in response to receiving PFAIL signal 420 indicating a power fail condition, supervisory controller 124 or a component thereof (e.g., processor 202) is configured to perform one or more operations of a power fail process including controlling transistors 402 and 404 so that $V_{switched}$ 160 is the voltage from energy storage device 410, and energy storage device 410 is used (sometimes said to be "discharged") to provide power to storage device 120.

In some embodiments, during regular operation of storage device 120, $V_{dd}$ 152 is used to supply power to storage device 120. However, during the power fail process, energy storage device 410 is used to provide power to storage device 120. In some embodiments, supervisory controller 124 or a component thereof (e.g., processor 202) controls transistors 402 and 404 via control lines 318 to control $V_{switched}$ 160 to be voltage from $V_{dd}$ 152 (e.g., during regular operation) or voltage from energy storage device 410 (e.g., during the power fail process). For example, during regular operation of storage device 120, transistor 402 is turned on (e.g., to complete the connection between $V_{dd}$ 152 and $V_{switched}$ 160) and transistor 404 is turned off (e.g., to disable the connection between energy storage device 410 and $V_{switched}$ 160) so that $V_{dd}$ 152 is used to supply power to storage device 120. However, during the power fail process, transistor 402 is turned off (e.g., to disable the connection between $V_{dd}$ 152 and $V_{switched}$ 160) and transistor 404 is turned on (e.g., to enable the connection between energy storage device 410 and $V_{switched}$ 160) so that energy storage device 410 is used to provide power to storage device 120. Although a single energy storage device 410 is shown in FIG. 4, any energy storage device, including one or more capacitors, one or more inductors, or one or more other passive elements that store energy, may be used to store energy to be used during the power fail process.

In some embodiments, energy storage device 410 is charged using $V_{holdup}$ 408, a voltage higher than $V_{dd}$ 152. In some embodiments, $V_{dd}$ 152 is boosted up to $V_{holdup}$ 408 using boost circuitry 406 (e.g., 1.35 volts or 1.5 volts is boosted up to 5.7 volts). In some embodiments, boost circuitry 406 is controlled and enabled by supervisory controller 124 (e.g., via processor 202).

Further, in some embodiments, $V_{switched}$ 160 is used as an input to keeper circuitry 412, which along with $V_{SPD}$ 156 provides power to processor 202. During the power fail process, $V_{switched}$ 160 is provided via keeper circuitry 412 to processor 202 so as to provide power to processor 202. In some embodiments, $V_{SPD}$ 156 provides power to keeper circuitry 412. In some embodiments, logic block 414 (e.g., OR or XOR) determines which of keeper circuitry 412 or $V_{SPD}$ 156 provides power to supervisory controller 124 (e.g., processor 202).

Furthermore, in some embodiments, during a power up sequence, $V_{SPD}$ 156 is provided to storage device 120 before $V_{dd}$ 152 is provided to storage device 120. This allows devices in storage device 120 (e.g., supervisory controller 124 and, in turn, processor 202) to operate before main power $V_{dd}$ 152 is provided to storage device 120. In some embodiments, supervisory controller 124 or a component thereof (e.g., processor 202) includes one or more connections 162 used to monitor and control other functions within storage device 120.

For example, in some embodiments, supervisory controller 124 or a component thereof (e.g., processor 202) detects a unique location associated with storage device 120, determines a time delay for storage device 120 in accordance with the unique location associated with storage device 120, and delays at least one power-on operation of storage device 120 (e.g., delays charging of energy storage device 410) by the determined time delay for storage device 120. In some embodiments, delaying at least one power-on operation of storage device 120 by the time delay for storage device 120 includes delaying enabling of a power regulator (e.g., in power control 127, FIG. 1) dedicated to providing power to energy storage device 410 by the time delay for storage device 120.

Figure 5:
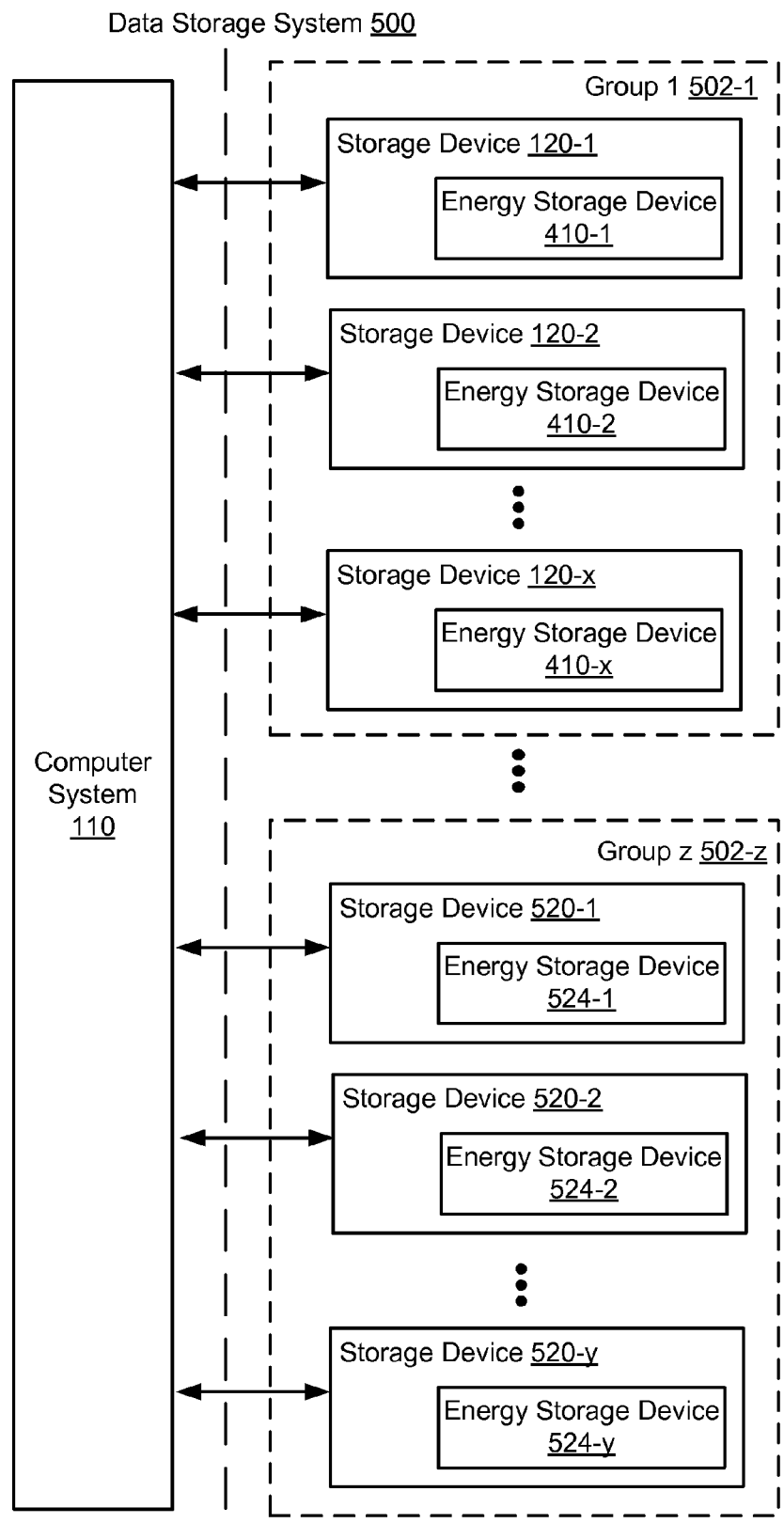
FIG. 5 is a block diagram illustrating an implementation of a data storage system, in accordance with some embodiments.

FIG. 5 is a block diagram illustrating an implementation of a data storage system 500, in accordance with some embodiments. While some example features are illustrated, various other features have not been illustrated for the sake of brevity and so as not to obscure more pertinent aspects of the example implementations disclosed herein. To that end, as a non-limiting example, data storage system 500 includes storage devices 120 (e.g., storage device 120-1 through storage device 120-x) and storage devices 520 (e.g., storage device 520-1 through storage device 520-y), which are used in conjunction with computer system 110. In some embodiments, storage devices 120, 520 each include the features described above with respect to storage device 120 in FIG. 1. In some embodiments, data storage system 500 includes a plurality of groups of storage devices (e.g., two or more, three or more, etc.). In some embodiments, storage devices 120 are in a first group (e.g., Group 1 (502-1)) and storage devices 520 are in a second group (e.g., Group 2 (502-z)). In some embodiments, the first group and the second group have different numbers of storage devices. For example, in some embodiments, a first group includes 8 storage devices (e.g., storage device 120-1 though storage device 120-8) and a second group includes 4 storage devices (e.g., storage device 520-1 through storage device 520-4). In some embodiments, for example, computer system 110 has 16 DIMM device slots, with 12 DIMM devices populated, 8 DIMM devices in a first group (e.g., storage device 120-1 though storage device 120-8) and 4 DIMM devices in a second group (e.g., storage device 520-1 through storage device 520-4). Although not explicitly shown, in some embodiments, data storage system 500 includes one or more additional storage devices grouped in one or more additional groups.

In some embodiments, storage devices 120 include energy storage device 410 (e.g., storage device 120-1 through storage device 120-x include energy storage device 410-1 through energy storage devices 410-x, respectively) and storage devices 520 include energy storage device 524 (e.g., storage device 520-1 through storage device 520-y include energy storage devices 524-1 through energy storage devices 524-y, respectively). In some embodiments, each storage device (e.g., storage devices 120, 520) includes a controller (e.g., a supervisory controller, not shown) to control power-on operations.

Traditional DIMM devices generally do not consume significant power upon initial power up. Further, traditional DIMM devices generally power up at the same time when power is first applied (e.g., by computer system 110). Once all the DIMM devices are powered up, a host system (e.g., computer system 110) can use the DIMM devices and distribute input/output (I/O) operations (e.g., read commands and/or write commands) across the array of DIMM devices. However, the storage devices disclosed herein have data hardening functionality (e.g., DIMM devices including non-volatile memory, such as flash memory), including use energy storage devices (e.g., energy storage device 410, FIG. 4) to store energy for later use, if and when input power (e.g., $V_{dd}$ 152 and/or $V_{SPD}$ 156, FIG. 1) is lost. In some implementations, for a given storage device (e.g., storage device 120-1), the energy storage device (e.g., energy storage device 410, FIG. 4) is charged prior to the storage device becoming available to the host system (e.g., computer system 110) for certain operations (e.g., read and/or write operations), and this charging can result in high initial charge currents. In a host system (e.g., computer system 110) with multiple storage device slots (e.g., 16 DIMM device slots) populated by multiple storage devices (e.g., 12 DIMM devices populated), power-on operations of the storage devices (e.g., storage devices 120, 520) are important for managing power demands on the host system during power-on (sometimes called power-up) conditions. Furthermore, in some cases, charging the energy storage devices of all the DIMM devices takes longer than charging the energy storage devices of a subset of the DIMM devices. Thus, in some cases, charging the energy storage devices of a subset of the DIMM devices before charging the energy storage devices of other DIMM devices in the data storage system enables the subset of the DIMM devices to become available to the host system (e.g., for read and/or write operations) faster than charging the energy storage devices of all the DIMM devices simultaneously and making all the DIMM devices available to the host system only after charging the energy storage devices of all the DIMM devices in the data storage system.

In some embodiments, data storage system 500 uses a staggered approach to power on storage devices 120, 520 to stagger the high initial charge currents associated with charging each of the energy storage devices. In some embodiments, charging of the energy storage device on each storage device is delayed by a time delay determined in accordance with a unique location associated with each storage device. In an example, the first group includes 8 storage devices (e.g., storage device 120-1 though storage device 120-8) and the storage devices are located in slot 0 though slot 7, respectively (e.g., storage device 120-1 is located in slot 0, storage device 120-2 is located in slot 1, . . . , and storage device 120-8 is located in slot 7). In some embodiments, a general DIMM slot includes three input signals that are normally used for System Management Bus (SMBus) addressing and in some embodiments, each signal has a pull-up resistor on the motherboard of the host system (e.g., computer system 110). The host system sets the state of these three input signals for each slot such that each of the 8 slots (e.g., slot 0 through slot 7) has a unique address (sometimes called slot location). For example, in some embodiments, slot 0 has an address of 000 (in binary), slot 1 has an address of 001, slot 2 has an address of 010, and so on.

In some embodiments, the supervisory controller associated with each storage device detects the unique address associated with the storage device (e.g., the slot location) and determines a time delay for the storage device based on the address. In some embodiments, determining the time delay for the storage device in accordance with the unique location associated with the storage device includes using a predefined time interval to determine the time delay. In some embodiments, determining the time delay for the storage device in accordance with the unique location associated with the storage device includes multiplying the unique address by a predefined time interval to determine the time delay.

For example, in some embodiments, using the example above where storage devices 120-1 through storage devices 120-8 are located in slot 0 through slot 7, respectively, and using a predefined time interval (sometimes called stagger time) of 50 milliseconds (ms) to determine the time delay, supervisory controller 124-1 detects that storage device 120-1 is located in slot 0 with an address of 000 and determines a time delay for storage device 120-1 of 0 ms (i.e., 0*50 ms), accordingly. Similarly, supervisory controller 124-2 detects that storage device 120-2 is located in slot 1 with an address of 001 and determines a time delay for storage device 120-2 of 50 ms (i.e., 1*50 ms), accordingly, supervisory controller 124-3 detects that storage device 120-3 is located in slot 2 with an address of 010 and determines a time delay for storage device 120-3 of 100 ms (i.e., 2*50 ms), accordingly, and so on (e.g., time delay for storage device 120-4 in slot 3 is 150 ms, time delay for storage device 120-5 in slot 4 is 200 ms, time delay for storage device 120-6 in slot 5 is 250 ms, time delay for storage device 120-7 in slot 6 is 300 ms, and time delay for storage device 120-8 in slot 7 is 350 ms). Although 50 ms is used as the predefined time interval in this example, in other embodiments, a shorter or longer predefined time interval may be used. In some embodiments, the predefined time interval is less than a charge time to charge the energy storage device to a predefined level, as discussed in more detail with respect to FIG. 6 below.

In some embodiments, the supervisory controller associated with each storage device detects the address associated with the storage device (e.g., the slot location) and one or more additional signals (e.g., a group number) and determines a time delay for the storage device based on the unique location associated with the storage device (e.g., the address and group number of the storage device). For example, in some embodiments, data storage system 500 has 12 storage devices populated, with 8 storage devices populated in a first group (e.g., storage device 120-1 though storage device 120-8) and 4 storage devices populated in a second group (e.g., storage device 520-1 through storage device 520-4). In some embodiments, determining the time delay for the storage device in accordance with the unique location associated with the storage device includes multiplying the address by a predefined time interval to determine the time delay and further adding a group time delay. For example, in some embodiments, if the predefined time interval is 50 ms, the group time delay for the first group is 0 ms, and the group time delay for the second group is 400 ms, the storage devices in the first group are staggered by 50 ms intervals, starting with 0 ms, and the storage devices in the second group are staggered by 50 ms intervals, starting with 400 ms (e.g., time delay for a storage device=(slot location*predefined time interval)+group time delay). In that example, storage device 120-1 (e.g., located in slot 0 of the first group) has a time delay of 0 ms (i.e., (0*50 ms)+0 ms), storage device 120-2 (e.g., located in slot 1 of the first group) has a time delay of 50 ms (i.e., (1*50 ms)+0 ms), storage device 120-3 (e.g., located in slot 2 of the first group) has a time delay of 100 ms (i.e., (2*50 ms)+0 ms), and so on. Using the same example, storage device 520-1 (e.g., located in slot 0 of the second group) has a time delay of 400 ms (i.e., (0*50 ms)+400 ms), storage device 520-2 (e.g., located in slot 1 of the second group) has a time delay of 450 ms (i.e., (1*50 ms)+400 ms), storage device 520-3 (e.g., located in slot 2 of the second group) has a time delay of 500 ms (i.e., (2*50 ms)+400 ms), and storage device 520-3 (e.g., located in slot 2 of the second group) has a time delay of 500 ms (i.e., (2*50 ms)+400 ms).

In some embodiments, the supervisory controller associated with each storage device obtains a time delay for the storage device from non-volatile memory in the storage device (e.g. in time delay table 226, FIG. 2). For example, in some embodiments, a time delay table stores a plurality of predefined time delays (e.g., time delays associated with various unique locations), and the supervisory controller associated with each storage device uses the time delay associated with the unique location for the storage device. As one example, using the example above, supervisory controller 524-1 detects that storage device 520-1 is located in slot 0 of the second group and obtains the corresponding time delay from a time delay table in non-volatile memory in storage device 520-1. In other embodiments, the supervisory controller associated with each storage device obtains a time delay for the storage device from a host system (e.g., computer system 110).

Figure 6:
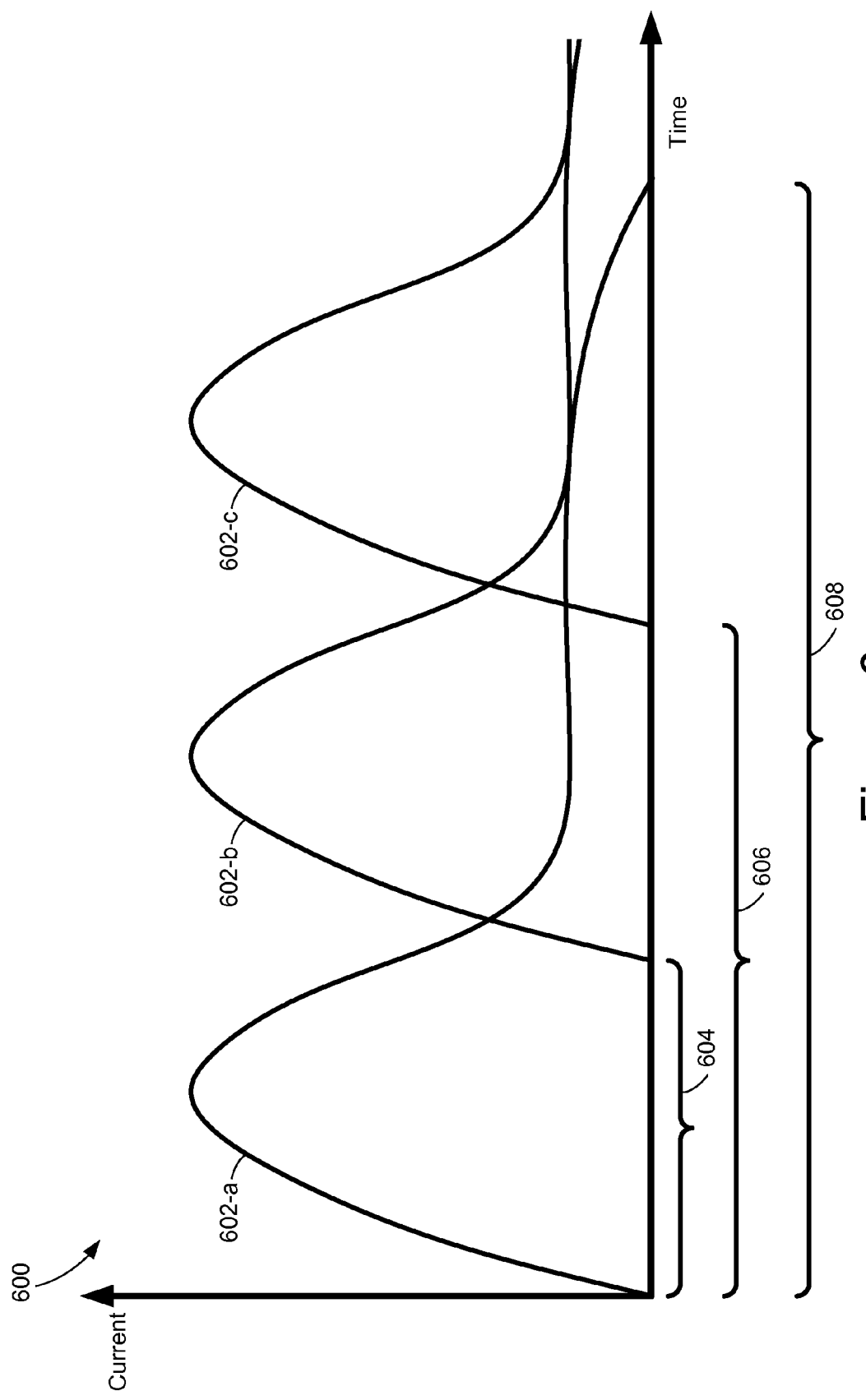
FIG. 6 illustrates a sequence of charge currents over time, in accordance with some embodiments.

FIG. 6 illustrates a sequence 600 of charge currents over time, in accordance with some embodiments. In some embodiments, sequence 600 illustrates charge currents associated with charging three energy storage devices in three storage devices, respectively (e.g., energy storage devices 410-1 through 410-3 in storage devices 120-1 through 120-3, FIG. 5). Charge currents 602-a, 602-b, 602-c shown in FIG. 6 have been simplified for illustrative purposes, but generally show that when an energy storage device (e.g., one or more capacitors) is initially charged, the initial charge current is high and then levels off. In some embodiments, charge current 602-a illustrates the charge current associated with charging a first energy storage device (e.g., in storage device 120-1, FIG. 5), charge current 602-b illustrates the charge current associated with charging a second energy storage device (e.g., in storage device 120-2, FIG. 5), and charge current 602-c illustrates the charge current associated with charging a third energy storage device (e.g., in storage device 120-3, FIG. 5). In this example, charge current 602-a begins at time 0, charge current 602-b begins after a time period 604, and charge current 602-c begins after a time period 606. Time period 608 illustrates a charge time to charge the first energy storage device (e.g., in storage device 120-1, FIG. 5) to a predefined level.

Using the example discussed above with respect to FIG. 5, storage device 120-1 is located in slot 0, storage device 120-2 is located in slot 1, and storage device 120-3 is located in slot 2. In this example, sequence 600 illustrates a staggered approach to power on storage devices 120-1 through 120-3 to stagger the high initial charge currents associated with charging each of the energy storage devices. In some embodiments, as discussed above with respect to FIG. 5, using a predefined time interval (e.g., 50 ms) and/or the unique location of each storage device, a controller of each storage device determines the time delay for the storage device (e.g., supervisory controller 124-1 determines a time delay for storage device 120-1 of 0 ms, supervisory controller 124-2 determines a time delay for storage device 120-2 of 50 ms, and supervisory controller 124-3 determines a time delay for storage device 120-3 of 100 ms). In some embodiments, at least one power-on operation of the storage device (e.g., charging of the energy storage device) is delayed by the determined time delay for the storage device. Thus, storage device 120-1 starts charging its energy storage device at time 0 (e.g., at 0 ms), storage device 120-2 starts charging its energy storage device after time period 604 (e.g., at 50 ms), and storage device 120-3 starts charging its energy storage device after time period 606 (e.g., at 100 ms). Further, the energy storage device of storage device 120-1 is charged to a predefined level (e.g., charged to 100%) by time period 608. In some embodiments, the predefined time interval (e.g., time period 604) is less than a charge time to charge an energy storage device to a predefined level (e.g., time period 608). Thus, power-on operations of multiple storage devices may overlap, but the initial high charge current associated with charging the energy storage devices are staggered accordingly.

Figure 7A:
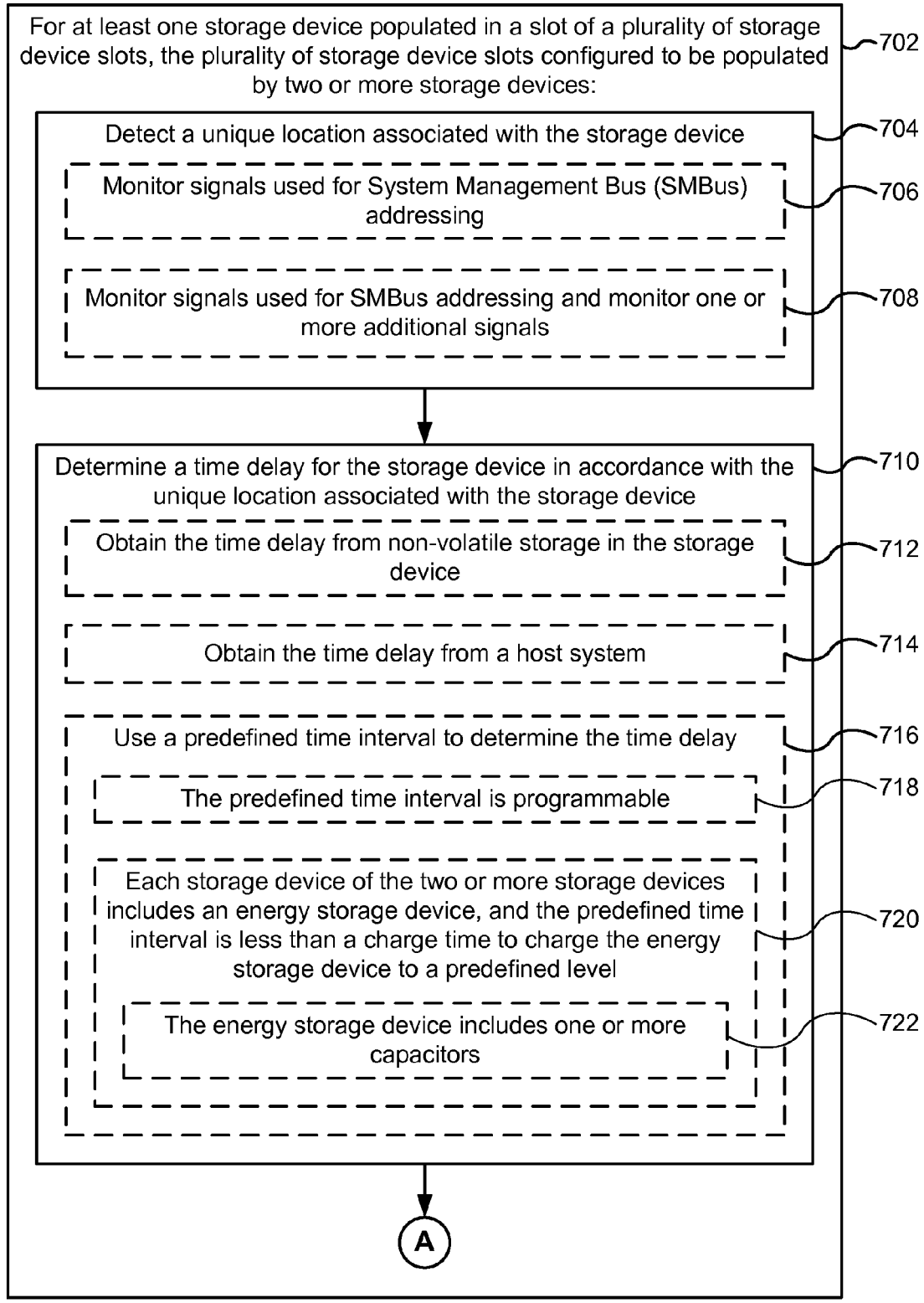
FIGS. 7A-7C illustrate a flowchart representation of a method of power management of a plurality of storage device slots configured to be populated by two or more storage devices, in accordance with some embodiments.
Figure 7B:
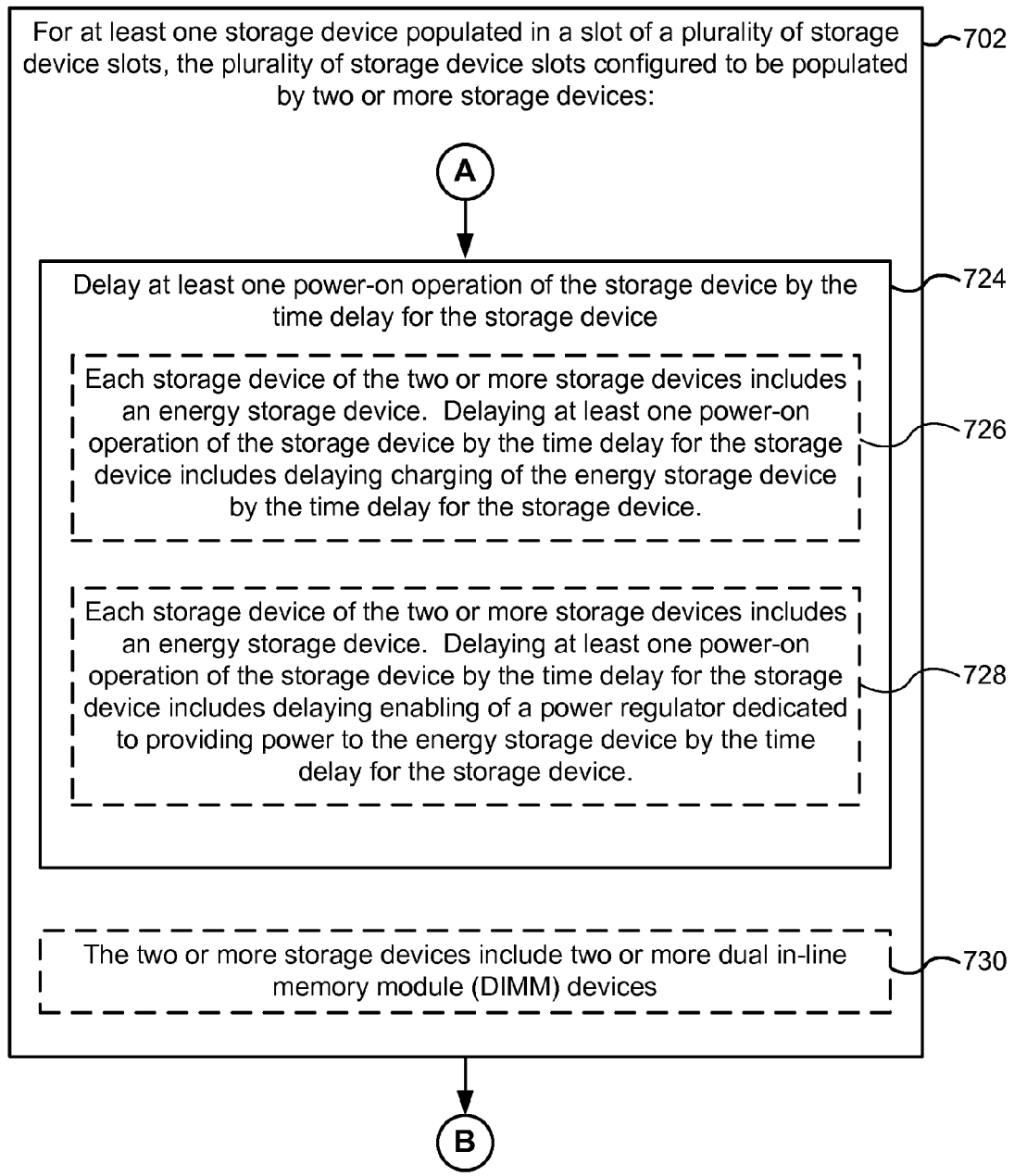
Figure 7C:
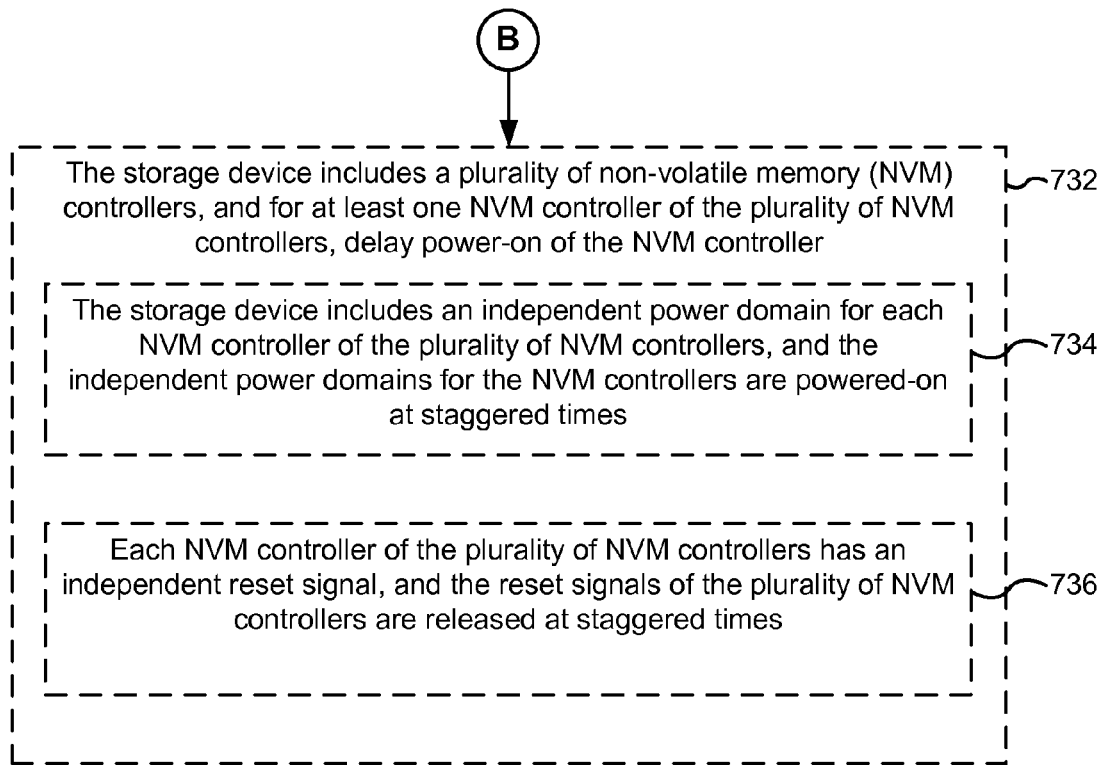

FIGS. 7A-7C illustrate a flowchart representation of a method 700 of power management of a plurality of storage device slots configured to be populated by two or more storage devices, in accordance with some embodiments. At least in some embodiments, method 700 is performed by a storage device (e.g., storage device 120, FIG. 1) or one or more components of the storage device (e.g., supervisory controller 124, power fail module 126, memory controller 128, and/or NVM controllers 130, FIG. 1), where the storage device is operatively coupled with a host system (e.g., computer system 110, FIG. 1). In some embodiments, method 700 is governed by instructions that are stored in a non-transitory computer readable storage medium and that are executed by one or more processors of a device, such as the one or more processors 202 of supervisory controller 124, as shown in FIG. 2.

For at least one storage device populated in a slot of a plurality of storage device slots, the plurality of storage device slots configured to be populated by two or more storage devices (702), the storage device (e.g., storage device 120, FIG. 1) detects (704) a unique location associated with the storage device. As described above with respect to FIG. 5, in some embodiments, the unique location associated with the storage device includes an address (or a slot location), while in other embodiments, the unique location associated with the storage device includes an address or a slot location (e.g., slot location 0) and one or more other location indicators (e.g., a group number). For example, in some embodiments, the unique location associated with storage device 120-2 (FIG. 5) is slot location 1 of group number 1, as described above with respect to FIG. 5. In some embodiments, a location module (e.g., location module 210, FIG. 2) is used to detect a unique location associated with the storage device, as described above with respect to FIG. 2.

In some embodiments, detecting the unique location associated with the storage device includes monitoring (706) signals used for System Management Bus (SMBus) addressing. As described above with respect to FIG. 5, in some embodiments, a general DIMM slot includes three input signals that are normally used for SMBus addressing. In some embodiments, each signal has a pull-up resistor on the motherboard of a host system (e.g., computer system 110, FIG. 1), and the host system sets the state of these three input signals for each slot such that each slot (e.g., slot 0 through slot 7) has a unique address (or a slot location). For example, in some embodiments, the monitored signals used for SMBus addressing for storage device 120-2 (FIG. 5) indicate an address (e.g., 001) or a slot location (e.g., slot location 1), as described above with respect to FIG. 5. In some embodiments, a monitoring module (e.g., monitoring module 212, FIG. 2) is used to monitor signals used for SMBus addressing, as described above with respect to FIG. 2.

In some embodiments, detecting the unique location associated with the storage device includes monitoring (708) signals used for SMBus addressing and monitoring one or more additional signals. In some embodiments, the one or more additional signals include one or more location indicators (e.g., a group number). In some embodiments, for example, the signals used for SMBus addressing (e.g., three input signals) provide unique addresses (e.g., slot locations) for eight storage devices. In some embodiments, where more than eight storage devices are populated in the plurality of storage device slots, one or more storage devices are grouped in a first group and one or more other storage devices are grouped in a second group, and detecting the unique address includes monitoring signals used for SMBus addressing and monitoring a respective group number. For example, in some embodiments, the monitored signals used for SMBus addressing and the monitored one or more additional signals for storage device 120-2 (FIG. 5) indicate an address of 001 (e.g., slot location 1) and a group number of 1 (e.g., storage device 120-2 is in the first group). In some embodiments, a monitoring module (e.g., monitoring module 212, FIG. 2) is used to monitor signals used for SMBus addressing and monitor one or more additional signals, as described above with respect to FIG. 2.

In some embodiments, the storage device determines (710) a time delay for the storage device in accordance with the unique location associated with the storage device. In some embodiments, determining the time delay for the storage device in accordance with the unique location associated with the storage device includes determining the time delay for the storage device in accordance with the address (or the slot location) of the storage device. Using the example above, in some embodiments, determining the time delay for storage device 120-2 (FIG. 5) in accordance with the unique location associated with storage device 120-2 includes determining the time delay for storage device 120-2 in accordance with its address (e.g., 001 or slot location 1). In some embodiments, determining the time delay for the storage device in accordance with the unique location associated with the storage device includes determining the time delay for the storage device in accordance with the address (or the slot location) of the storage device and in accordance with one or more location indicators (e.g., group number) of the storage device. Using the example above, in some embodiments, determining the time delay for storage device 120-2 (FIG. 5) in accordance with the unique location associated with storage device 120-2 includes determining the time delay for storage device 120-2 in accordance with the address (e.g., 001) and the group number (e.g., 1) of the storage device 120-2. In some embodiments, a time delay module (e.g., time delay module 214, FIG. 2) is used to determine a time delay for the storage device in accordance with the unique location associated with the storage device, as described above with respect to FIG. 2.

In some embodiments, determining the time delay for the storage device in accordance with the unique location associated with the storage device includes obtaining (712) the time delay from non-volatile memory in the storage device. In some embodiments, the time delay (sometimes called stagger time) for the storage device is stored in non-volatile memory of the storage device (e.g., in time delay table 226 of supervisory controller 124, FIG. 2). In some embodiments, supervisory controller 124 obtains the time delay associated with the unique location for the storage device. As one example, using the example above, supervisory controller 224-2 detects that storage device 120-2 is located in slot 1 of the first group and obtains the corresponding time delay from non-volatile memory in storage device 120-2. In some embodiments, an obtaining module (e.g., obtaining module 216, FIG. 2) is used to obtain the time delay from non-volatile memory in the storage device, as described above with respect to FIG. 2.

In some embodiments, the non-volatile memory stores a single predefined time interval. In some embodiments, a time delay table (e.g., time delay table 226, FIG. 2) stores a plurality of predefined time delays (e.g., time delays associated with various unique locations). In some embodiments, the plurality of predefined time delays is not sequential (e.g., 0 ms, 100 ms, 50 ms, and 150 ms for slots 0 through 3). In some embodiments, the predefined time delays are not evenly spaced (e.g., 0 ms, 50 ms, 100 ms, 200 ms, 250, 350 ms, etc.).

In some embodiments, determining the time delay for the storage device in accordance with the unique location associated with the storage device includes obtaining (714) the time delay from a host system (e.g., computer system 110, FIGS. 1 and 5). In some embodiments, the time delay is obtained from the host system through a host interface (e.g., host interface 222, FIG. 1). In some embodiments, for example, storage device 120-2 obtains a time delay of 50 ms from a host system (e.g., computer system 110, FIG. 5). In some embodiments, the time delay obtained from the host system corresponds to a predefined time interval used to determine the time delay for the two or more storage devices. In some embodiments, an obtaining module (e.g., obtaining module 216, FIG. 2) is used to obtain the time delay from a host system, as described above with respect to FIG. 2.

In some embodiments, determining the time delay for the storage device in accordance with the unique location associated with the storage device includes using (716) a predefined time interval (e.g., a stagger time) to determine the time delay. In some embodiments, determining the time delay for the storage device in accordance with the unique location associated with the storage device includes multiplying the unique address by a predefined time interval to determine the time delay. For example, in some embodiments, using the example described above with respect to FIG. 5, where storage devices 120-1 through 120-8 are located in slot 0 through slot 7, respectively, and where the predefined time interval is 50 ms, storage device 120-2 is located in slot 1 with an address of 001 and determines a time delay for storage device 120-2 of 50 ms (i.e., 1*50 ms). In some embodiments, determining the time delay for the storage device in accordance with the unique location associated with the storage device includes multiplying the address by a predefined time interval to determine the time delay and further adding a group time delay. For example, in some embodiments, using the example described above with respect to FIG. 5, where storage devices 520-1 through 520-4 are located in slot 0 through slot 3, respectively, where storage devices 520 are in a second group, and where the predefined time interval is 50 ms and the group time delay for the second group is 400 ms, storage device 520-2 is located in slot 1 with an address of 001 and storage device 520-2 is located in the second group. Thus, in that example, the time delay (e.g., time delay=(slot location*predefined time interval)+group time delay) for storage device 520-2 is 450 ms (i.e., (1*50 ms)+400 ms). In some embodiments, a determination module (e.g., determination module 218, FIG. 2) is used to use a predefined time interval (e.g., a stagger time) to determine the time delay, as described above with respect to FIG. 2.

In some embodiments, the predefined time interval is (718) programmable. In some embodiments, the predefined time interval is programmable by a host system (e.g., computer system 110, FIG. 1). In some embodiments, one or more time delays associated with one or more predefined time intervals are stored in non-volatile memory of the storage device (e.g., in time delay table 226, FIG. 2). For example, for a predefined time interval of 50 ms, time delays of 0 ms, 50 ms, 100 ms, 150 ms, etc. are stored for slot location 0, slot location 1, slot location 2, slot location 3, and so on, and for a predefined time interval of 80 ms, time delays of 0 ms, 80 ms, 160 ms, 240 ms, etc. are stored for slot location 0, slot location 1, slot location 2, slot location 3, and so on. In some embodiments, when a host system selects the desired predefined time interval, the storage device uses the corresponding set of time delays. For example, for storage device 120-2 in slot location 1 (FIG. 5), if the predefined time interval is programmed to be 50 ms, the time delay for slot location 1 is 50 ms, and if the predefined time interval is programmed to be 80 ms, the time delay for slot location 1 is 80 ms. In some embodiments, the predefined time interval is programmable by a host system and the storage device computes time delay on the fly.

In some embodiments, each storage device of the two or more storage devices includes an energy storage device, and the predefined time interval is (720) less than a charge time to charge the energy storage device to a predefined level. For example, in some embodiments, referring to FIG. 6, the predefined time interval (e.g., time period 604) is less than a charge time to charge the energy storage device to a predefined level (e.g., time period 608). Thus, in the embodiments where the predefined time interval is less than the charge time, charging of a first storage device (e.g., storage device 120-1, FIG. 5) overlaps with charging of a second storage device (e.g., storage device 120-2, FIG. 5), as shown in FIG. 6 (e.g., charge current 602-*a* overlaps with charge current 602-*b*).

In other embodiments, the predefined time interval is equal to a charge time to charge the energy storage device to a predefined level. For example, if the predefined time interval is equal to the charge time, in FIG. 6, charge current 602-*b* would begin at time period 608 (e.g., time period 604 is equal to time period 608) and would not overlap with charge current 602-*a* (and would not overlap with charge current 602-*c*). Thus, in the embodiments where the predefined time interval is equal to the charge time, charging of a first storage device (e.g., storage device 120-1, FIG. 5) does not overlap with charging of a second storage device (e.g., storage device 120-2, FIG. 5).

In some embodiments, the energy storage device includes (722) one or more capacitors. For example, in some embodiments, the energy storage device includes a single capacitor, while in other embodiments, the energy storage device includes a plurality of capacitors. In some embodiments, the energy storage device includes one or more inductors. In some embodiments, the energy storage device includes one or more other passive elements that store energy.

In some embodiments, two or more storage devices of the storage devices populating the plurality of storage device slots have the same time delay. For example, in some embodiments, where six storage device slots are populated, first and second storage devices both have a first time delay, third and fourth storage devices both have a second time delay, and fifth and sixth storage devices both have a third time delay. In some embodiments, a number of storage devices that have a same time delay is programmable.

In some embodiments, the storage device delays (724) at least one power-on operation of the storage device by the time delay for the storage device. In some embodiments, when only one storage device is populated in the plurality of storage device slots, the time delay is zero and power-on of the storage device is not delayed. Using the example above where storage device 120-2 (FIG. 5) is located in slot 1 and the time delay for storage device 120-2 is determined to be 50 ms, at least one power-on operation of storage device 120-2 is delayed by 50 ms. In some embodiments, a power-on delay module (e.g., power-on delay module 220, FIG. 2) of the storage device is used to delay at least one power-on operation of the storage device by the time delay for the storage device, as described above with respect to FIG. 2.

In some embodiments, each storage device of the two or more storage devices includes (726) an energy storage device (e.g., energy storage device 410, FIG. 4). Delaying at least one power-on operation of the storage device by the time delay for the storage device includes delaying charging of the energy storage device by the time delay for the storage device. Using the example above where storage device 120-2 (FIG. 5) is located in slot 1 and the time delay for storage device 120-2 is determined to be 50 ms, charging of the energy storage device on storage device 120-2 (not shown) is delayed by 50 ms. In some embodiments, a control module (e.g., control module 222, FIG. 2) is used to delay charging of the energy storage device by the time delay for the storage device, as described above with respect to FIG. 2.

In some embodiments, each storage device of the two or more storage devices includes (728) an energy storage device. Delaying at least one power-on operation of the storage device by the time delay for the storage device includes delaying enabling of a power regulator (e.g., in power control 127, FIG. 1) dedicated to providing power to the energy storage device (e.g., energy storage device 410, FIG. 4) by the time delay for the storage device. In some embodiments, supervisory controller 124 (FIG. 1) generates separate signals for each power regulator for storage device 120 and controls when each of the power regulators is powered on (e.g., through control line 164, FIG. 1). In some embodiments, a control module (e.g., control module 222, FIG. 2) is used to delay enabling of a power regulator dedicated to providing power to the energy storage device by the time delay for the storage device, as described above with respect to FIG. 2.

In some embodiments, the two or more storage devices include (730) two or more dual in-line memory module (DIMM) devices. In some embodiments, the two or more storage devices include two or more non-volatile memory DIMM devices. In some embodiments, the two or more storage devices include two or more devices compatible with DIMM device slots. For example, in some embodiments, the two or more storage devices are compatible with 240-pin DIMM memory slots using a DDR3 interface specification. In some embodiments, the two or more storage devices include two or more single in-line memory module (SIMM) devices or two or more other types of storage devices.

In some embodiments, the storage device includes (732) a plurality of non-volatile memory (NVM) controllers (e.g., NVM controllers 130, FIG. 1), and for at least one NVM controller (e.g., NVM controller 130-2) of the plurality of NVM controllers, the storage device delays power-on of the NVM controller. In some embodiments, delaying power-on of the NVM controller includes determining a unique identifier for the NVM controller, determining a time delay for the NVM controller in accordance with the unique identifier, and delaying power-on (e.g., delaying reset) of the NVM controller by the time delay. For example, if storage device 120 includes two NVM controllers (e.g., NVM controller 130-1 and NVM controller 130-2), in some embodiments, storage device 120 delays power-on for at least one NVM controller (e.g., NVM controller 130-2). In some embodiments, delaying power-on for at least one NVM controller staggers the power-on for the plurality of NVM controllers in the storage device, which staggers their startup power demand and corresponding inrush currents. In some embodiments, staggering power-on for the plurality of NVM controllers is accomplished in a similar manner as staggering power-on for two or more storage devices, as described above (e.g., delay times are stored in non-volatile memory, delay times are obtained from a host system, and/or delay times are computed on the fly using a predefined time interval and/or a unique identifier). In some embodiments, a power-on delay module (e.g., power-on delay module 220, FIG. 2) is used to, for at least one NVM controller of the plurality of NVM controllers, delay power-on of the NVM controller, as described above with respect to FIG. 2.

In some embodiments, the storage device includes (734) an independent power domain for each NVM controller of the plurality of NVM controllers (e.g., NVM controllers 130, FIG. 1), and the independent power domains for the NVM controllers are powered-on at staggered times. In some embodiments, separate and independent power domains (e.g., separate and independent voltage regulators in power control 127, FIG. 1) for each NVM controller of the plurality of NVM controllers allows the storage device to stagger power-on for the plurality of NVM controllers on the storage device. As discussed above, in some embodiments, a supervisory controller (e.g., supervisory controller 124, FIG. 1) generates separate signals for each voltage regulator for the storage device and controls when each of the voltages regulators is powered on (e.g., through control line 164, FIG. 1). In some embodiments, a control module (e.g., control module 222, FIG. 2) is used to power-on the independent power domains for the NVM controllers at staggered times, as described above with respect to FIG. 2.

In some embodiments, each NVM controller of the plurality of NVM controllers (e.g., NVM controllers 130, FIG. 1) has (736) an independent reset signal, and the reset signals of the plurality of NVM controllers are released at staggered times. In some embodiments, if the storage device uses a single power domain for the plurality of NVM controllers on the storage device, the storage device staggers power-on for the plurality of NVM controllers on the storage device by staggering the reset signals to each NVM controller. In some implementations, the reset signals to the NVM controllers are released at staggered times. The staggered timing of the releasing of the reset signals to each NVM controller effectively staggers the startup power demands of the NVM controllers and corresponding inrush currents. In some embodiments, a control module (e.g., control module 222, FIG. 2) is used to release the reset signals of the plurality of NVM controllers at staggered times, as described above with respect to FIG. 2.

In some embodiments, a storage device includes a plurality of non-volatile memory (NVM) controllers (e.g., NVM controllers 130, FIG. 1), and for at least one NVM controller (e.g., NVM controller 130-2) of the plurality of NVM controllers, the storage device delays power-on of the NVM controller, as discussed above with respect to operation 732. For example, in some embodiments, the storage device delays power-on of at least one NVM controller relative to power-on of another NVM controller of the storage device. In this example, the time delay for the storage device, determined in accordance with the unique location associated with the storage device, determines a time delay for power-on of a first NVM controller of the storage device, while at least one other NVM controller of the storage device is powered on with a different, larger, time delay. For example, each NVM controller of the storage device is assigned a time delay offset in accordance with a unique identifier of the NVM controller (e.g., an internal bus address, or memory mapped address).

In some embodiments, a data storage system 100 (FIG. 1) includes a single storage device 120 having a plurality of non-volatile memory (NVM) controllers (e.g., NVM controllers 130, FIG. 1). In some embodiments, the storage device 120 delays power-on of at least one NVM controller relative to power-on of another NVM controller of the storage device. For example, each NVM controller of the storage device is assigned a time delay offset and is powered on at a time corresponding to its assigned time delay offset. For example, each NVM controller of the storage device is assigned a time delay offset in accordance with a unique identifier of the NVM controller (e.g., an internal bus address, or memory mapped address).

It will be understood that, although the terms "first," "second," etc. may be used herein to describe various elements, these elements should not be limited by these terms. These terms are only used to distinguish one element from another. For example, a first NVM controller could be termed a second NVM controller, and, similarly, a second NVM controller could be termed a first NVM controller, without changing the meaning of the description, so long as all occurrences of the "first NVM controller" are renamed consistently and all occurrences of the "second NVM controller" are renamed consistently. The first NVM controller and the second NVM controller are both NVM controllers, but they are not the same NVM controller.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of power management of a storage system having a plurality of storage device slots configured to be populated by two or more storage devices, the method comprising:
    for at least one storage device populated in a slot of the plurality of storage device slots:
        detecting a unique location associated with the storage device;
        determining a time delay for the storage device in accordance with the unique location associated with the storage device; and
        delaying at least one power-on operation of the storage device by the time delay for the storage device;
        wherein detecting the unique location associated with the storage device includes monitoring signals used for System Management Bus (SMBus) addressing.

2. The method of claim 1, wherein the two or more storage devices include two or more dual in-line memory module (DIMM) devices.

3. The method of claim 1, wherein detecting the unique location associated with the storage device further includes monitoring one or more additional signals.

4. The method of claim 1, wherein the two or more storage devices are grouped in two or more groups, and the time delay for a respective storage device corresponding to a respective group number is determined in accordance with the respective group number.

5. The method of claim 1, wherein determining the time delay for the storage device in accordance with the unique location associated with the storage device includes using a predefined time interval to determine the time delay.

6. The method of claim 5, wherein the predefined time interval is programmable.

7. The method of claim 1, wherein each storage device of the two or more storage devices includes an energy storage device, and delaying at least one power-on operation of the storage device by the time delay for the storage device includes delaying charging of the energy storage device by the time delay for the storage device.

8. The method of claim 7, wherein the energy storage device includes one or more capacitors.

9. The method of claim 1, wherein each storage device of the two or more storage devices includes an energy storage device, and delaying at least one power-on operation of the storage device by the time delay for the storage device includes delaying enabling of a power regulator dedicated to providing power to the energy storage device by the time delay for the storage device.

10. The method of claim 1, wherein the storage device includes a plurality of non-volatile memory (NVM) controllers, the method further comprising:
    for at least one NVM controller of the plurality of NVM controllers, delaying power-on of the NVM controller.

11. The method of claim 10, wherein the storage device includes an independent power domain for each NVM controller of the plurality of NVM controllers, and the independent power domains for the NVM controllers are powered-on at staggered times.

12. The method of claim 10, wherein each NVM controller of the plurality of NVM controllers has an independent reset signal, and the reset signals of the plurality of NVM controllers are released at staggered times.

13. A method of power management of a storage system having a plurality of storage device slots configured to be populated by two or more storage devices, the method comprising:
    for at least one storage device populated in a slot of the plurality of storage device slots:
        detecting a unique location associated with the storage device;
        determining a time delay for the storage device in accordance with the unique location associated with the storage device; and
        delaying at least one power-on operation of the storage device by the time delay for the storage device;
    wherein the time delay determined for the storage device in accordance with the unique location associated with the storage device corresponds to a time delay obtained from non-volatile memory in the storage device.

14. A storage device of a storage system, comprising:
    an interface for operatively coupling the storage device with a host system distinct from the storage system;
    an energy storage device; and
    a controller with one or more processors and memory, the controller configured to:
        detect a unique location associated with the storage device;
        determine a time delay for the storage device in accordance with the unique location associated with the storage device; and
        delay at least one power-on operation of the storage device by the time delay for the storage device;
        wherein the controller is configured to monitor, for detecting the unique location associated with the storage device, signals used for System Management Bus (SMBus) addressing.

15. The storage device of claim 14, wherein the storage device includes a dual in-line memory module (DIMM) device.

16. The storage device of claim 14, wherein the controller is configured to delay charging of the energy storage device by the time delay for the storage device.

17. The storage device of claim 14, wherein the controller is configured to delay enabling of a power regulator dedicated to providing power to the energy storage device by the time delay for the storage device.

18. The storage device of claim 14, wherein the storage device includes a plurality of non-volatile memory (NVM) controllers, and the storage device is configured to:
    for at least one NVM controller of the plurality of NVM controllers, delay power-on of the NVM controller.

19. A non-transitory computer readable storage medium, storing one or more programs for execution by one or more processors of a storage device of a storage system, the one or more programs including instructions for:
- detecting a unique location associated with the storage device;
- determining a time delay for the storage device in accordance with the unique location associated with the storage device; and
- delaying at least one power-on operation of the storage device by the time delay for the storage device;
- wherein detecting the unique location associated with the storage device includes monitoring signals used for System Management Bus (SMBus) addressing.

\* \* \* \* \*